US012503285B2

(12) United States Patent
Bacher et al.

(10) Patent No.: US 12,503,285 B2
(45) Date of Patent: *Dec. 23, 2025

(54) MASON JAR VALVED-LID COMPONENT AND KIT FOR USE IN FERMENTATION

(71) Applicant: MASONTOPS IP HOLDINGS INC, Toronto (CA)

(72) Inventors: Michael Bacher, Toronto (CA); Philip D. Baron, Toronto (CA)

(73) Assignee: Masontops IP Holdings Inc., Toronto (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/402,524

(22) Filed: Jan. 2, 2024

(65) Prior Publication Data

US 2025/0115400 A1 Apr. 10, 2025

Related U.S. Application Data

(63) Continuation of application No. 18/080,543, filed on Dec. 13, 2022, now Pat. No. 11,858,702, which is a continuation of application No. 16/702,267, filed on Dec. 3, 2019, now Pat. No. 11,524,825, which is a continuation of application No. 15/259,182, filed on Sep. 8, 2016, now Pat. No. 10,501,244.

(60) Provisional application No. 62/218,625, filed on Sep. 15, 2015.

(51) Int. Cl.

| | |
|---|---|
| ***B65D 51/16*** | (2006.01) |
| ***A23B 7/10*** | (2006.01) |
| ***B65D 51/14*** | (2006.01) |

(52) U.S. Cl.
CPC ............ *B65D 51/165* (2013.01); *A23B 7/105* (2013.01); *B65D 51/145* (2013.01)

(58) Field of Classification Search
CPC ...... B65D 51/165; B65D 51/145; A23B 7/105
See application file for complete search history.

(56) References Cited

U.S. PATENT DOCUMENTS 107,003 A * 9/1870 Clark ................. B65D 51/1661 215/315
1,865,764 A * 7/1932 Keenan ................ B65D 51/165 137/859
2,726,002 A * 12/1955 Dalianis ................. B65D 41/42 215/328
2,794,436 A * 6/1957 Kurkjian .................. A61J 11/00 215/11.1

(Continued)

*Primary Examiner* — James N Smalley
(74) *Attorney, Agent, or Firm* — McAndrews, Held & Malloy, Ltd.

(57) ABSTRACT

The present disclosure is directed to a lid component for use with a jar and a band. The jar and band may be a mason jar and a band for a mason jar. The lid component is made of an air-impermeable material and is dimensioned and configured to be releasably attachable to the jar by the band and to seal a wide mouth opening of the jar in an air-tight manner. The lid component comprises a one-way valve adapted to allow gas to escape from the jar while, at the same time, prevent air from entering the jar, when the lid component is releasably attached to the jar. The one-way valve comprises a bottom opening and a protruding top wall. The lid component further comprises a sealing wall that extends radially outwardly from the bottom opening. The sealing wall is substantially flat.

22 Claims, 5 Drawing Sheets

(56) References Cited

U.S. PATENT DOCUMENTS

| | | | | | |
|---|---|---|---|---|---|
| 2,942,746 | A * | 6/1960 | Porthouse | A61J 11/02 | 215/11.1 |
| 3,310,193 | A * | 3/1967 | Macpherson | B65D 51/165 | 215/311 |
| 3,696,958 | A * | 10/1972 | Lee | B65D 51/165 | 215/261 |
| 5,769,285 | A * | 6/1998 | Upham | A01K 9/005 | 215/11.1 |
| 6,053,194 | A * | 4/2000 | Nelson | F16K 15/147 | 137/71 |
| 2018/0105334 | A1 * | 4/2018 | Carver | B65D 47/2018 | |

* cited by examiner

MASON JAR VALVED-LID COMPONENT AND KIT FOR USE IN FERMENTATION

This application is a continuation of U.S. patent application Ser. No. 18/080,543, filed Dec. 13, 2022, which is a continuation of U.S. patent application Ser. No. 16/702,267, filed Dec. 3, 2019, which is a continuation of U.S. patent application Ser. No. 15/259,182, filed Sep. 8, 2016, which claims the benefit of U.S. provisional patent application 62/218,625, filed Sep. 15, 2015, under 35 U.S.C 119 (e), the contents of each of which are herein incorporated by reference in their entirety.

FIELD OF THE INVENTION

The present invention relates to articles for use in lacto-fermentation to create sour foodstuffs such as pickles, sauerkraut and the like.

BACKGROUND OF THE INVENTION

Lacto-fermentation is a process that is used to convert sugars to acids, alcohols and gases in anaerobic conditions. It broadly refers to the growth of micro-organisms on a growth medium. The micro-organisms used for the fermentation process are yeast, bacteria or both. Fermentation usually implies that the growth of micro-organisms in a medium is desirable growth.

People have used fermentation to produce food and beverages since the Neolithic age. For example, fermentation is used to preserve foods to produce sour foods such as sauerkraut, kimchi, pickled cucumbers, yogurt, as well as for producing alcoholic beverages such as wine.

A typical fermenting apparatus includes a 5+ gallon ceramic crock requiring the user to make a large quantity of fermented food product with each batch. If the food product spoils or has an undesirable taste, a large batch of ingredients may be wasted. Moreover, such apparatus can be difficult to store, and expensive in terms of both the cost of the apparatus and the cost of the ingredients used by the apparatus. Hence, the mason jar has emerged as a popular fermenting vessel—it is accessible, affordable, and small-batch oriented.

Mason jars are standardized wide-mouthed glass jars, with an airtight screw top, used for preserving foodstuffs such as fruit and vegetables. The jar's mouth has a screw thread on its outer perimeter to accept a metal ring (or "band"). The band, when screwed down, presses a separate stamped steel disc-shaped lid against the jar's rim. An integral rubber ring on the underside of the lid creates a hermetic seal. The bands and lids usually come with new jars, but they are also sold separately. While the bands are reusable, the lids are intended for single use when canning.

While there already exist articles for use in home canning and fermentation, the present invention is intended to provide a more convenient and effective article that is durable, safe, simple and easy-to-use, environmentally-friendly, more economical to manufacture, and which provides improved sealing.

SUMMARY OF THE INVENTION

The invention provides, in accordance with a first aspect, a lid component for use with a glass jar and band of a mason jar, the lid component being made of an air-impermeable material and being dimensioned and configured to be releasably attachable to the jar by the band and to seal the wide mouth opening of the glass jar in an air-tight manner, the lid component further comprising a one-way valve adapted to allow gas produced by a fermentation process to escape from the jar while, at the same time, prevent oxygen-containing air from entering the jar, when the lid component is releasably attached to the jar.

The lid component may be made of silicone rubber, be heat-resistant, BPA-free, reusable, recyclable, and/or dishwasher-safe.

According to a second aspect, the invention provides a fermentation kit comprising a lid according to the aforementioned first aspect of the invention, in combination with a glass mason jar and mason jar band.

Since the lid component can be used with conventional and standardized mason jars, and since mason jar components can be used in the present fermentation kit, the invention provides benefits to the environment and cost-savings associated with re-using or re-purposing existing mason jar components as compared to purchasing entirely new systems for fermentation. The lid component itself is compact and easy to store and, when silicone rubber is used, can be manufactured in a wide variety of colors to increase its attractiveness and for identification, labelling or classification purposes.

BRIEF DESCRIPTION OF THE DRAWINGS

The invention may be better understood with reference to the drawings in which.

DETAILED DESCRIPTION OF THE EMBODIMENTS

Figure 1:
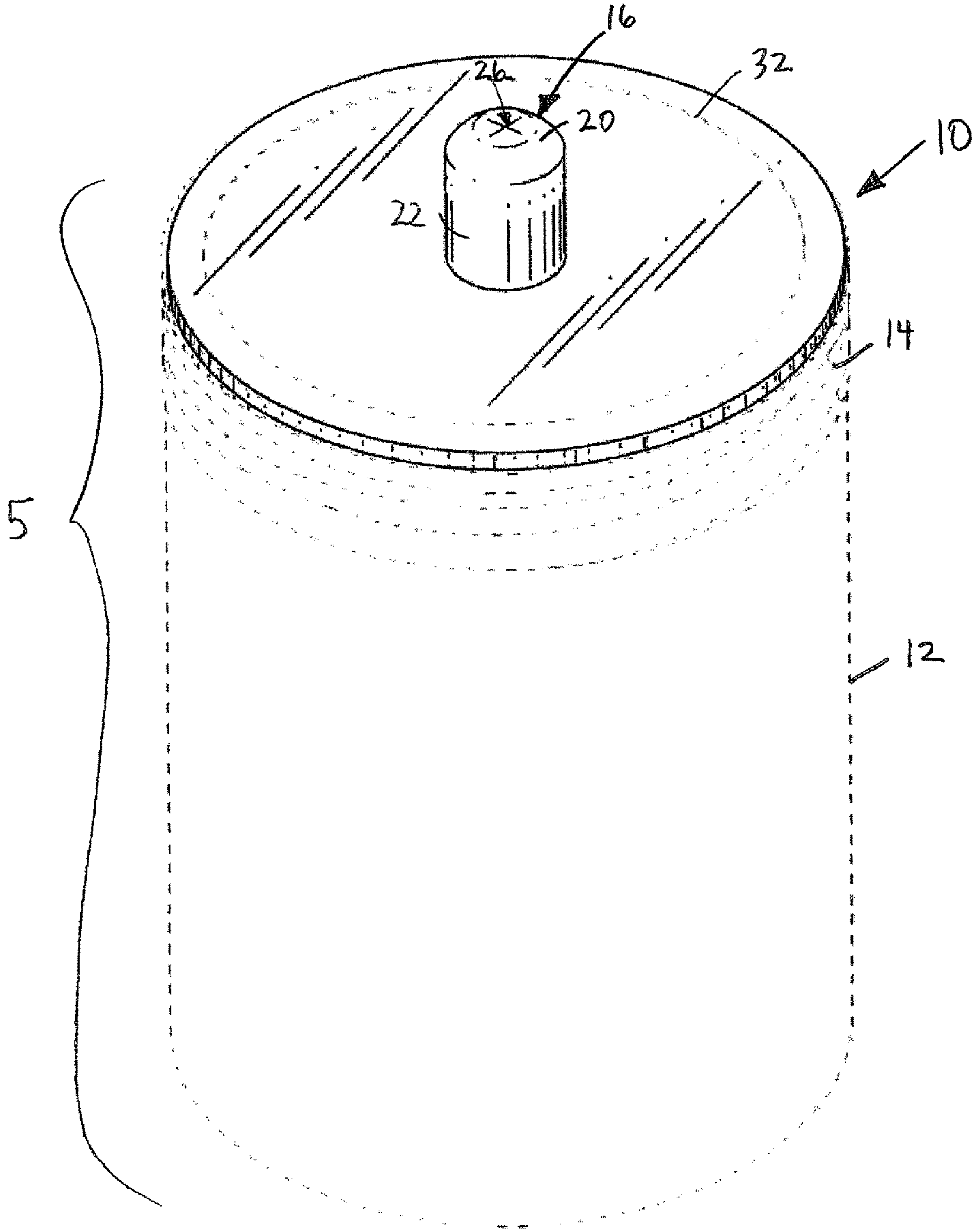
FIG. 1 is a top perspective view of an embodiment of the lid component shown secured to a glass mason jar using a mason jar band.
Figure 2:
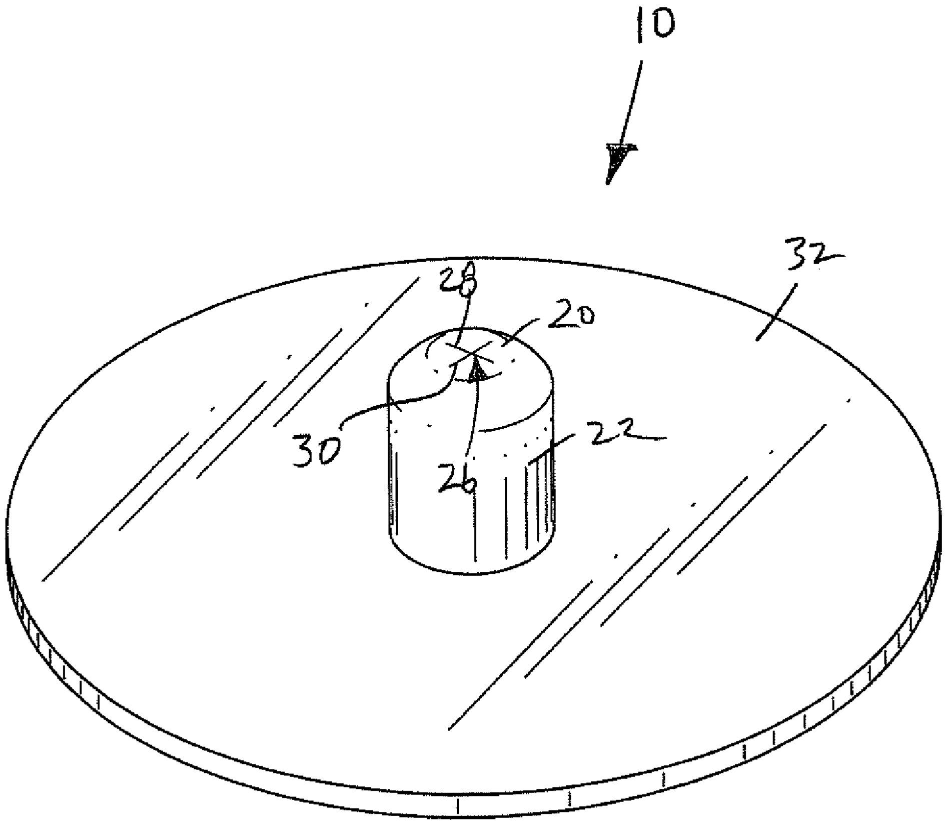
FIG. 2 is another top perspective view of the lid component of FIG. 1 with components of the mason jar removed.
Figure 3:
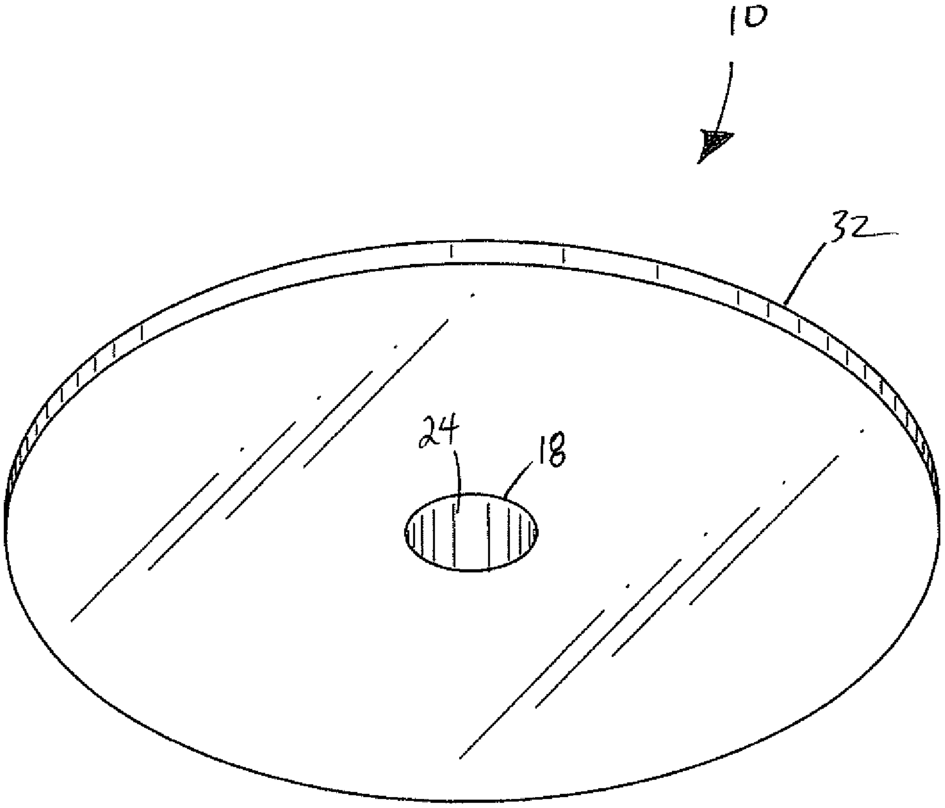
FIG. 3 is a bottom perspective view of the lid component of FIG. 1.

Referring firstly to FIG. 1, a fermentation kit 5 consisting of a lid component 10, glass jar 12 and band 14 of a mason jar, is shown. In this embodiment, the lid component 10 is made of an air-impermeable material, in this case, silicone rubber, and is dimensioned and configured to be releasably attachable to the glass jar 12 by the band 14 and to seal the wide mouth opening of the glass jar 12 in an air-tight manner. The lid component 10 further comprises a one-way valve 16 adapted to allow gas produced by a fermentation process occurring inside the jar 12 to escape from the jar 12 while, at the same time, prevent oxygen-containing air from outside the jar from entering the jar 12, when the container lid 10 is releasably attached to the jar 12 (as shown in FIG. 1).

Referring now to the remaining figures (FIGS. 2-7), the lid component 10 is of unitary construction for convenience, and ease of use and manufacture. In this case, the lid component 10 is made by injection molding. However, it will be appreciated that other molding processes and methods of manufacture may be used.

The silicone rubber material of the lid component 10 is flexible and resilient thereby providing a superior, air tight seal.

The valve 16 comprises a bottom opening 18 (see FIGS. 3 and 7), a top wall 20 (FIGS. 1, 2, 4, 5, and 6) and an upstanding peripheral side wall 22 (FIGS. 1, 2, 4, and 5) extending from the bottom opening 18 to the top wall 20. The peripheral side wall 22 defines a space 24 and the top wall 20 has at least one opening 26 in the form of perpendicular slits 28, 30 (see, e.g., FIG. 6) which are biased towards a closed position (shown in all figures) and movable to an open position when pressure inside the space 24 (and by extension the interior of the glass jar) exceeds atmospheric pressure (pressure outside of the jar) by a threshold amount.

Figure 5:
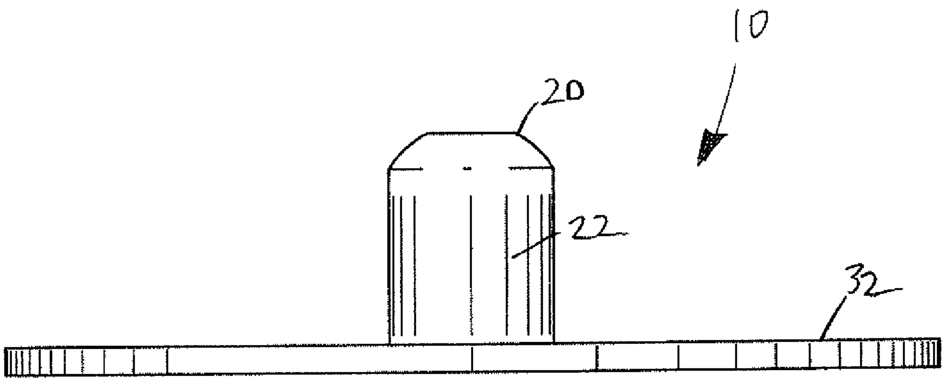
FIG. 5 is a side view of the lid component of FIG. 1 from a second side, opposite the first side.
Figure 6:
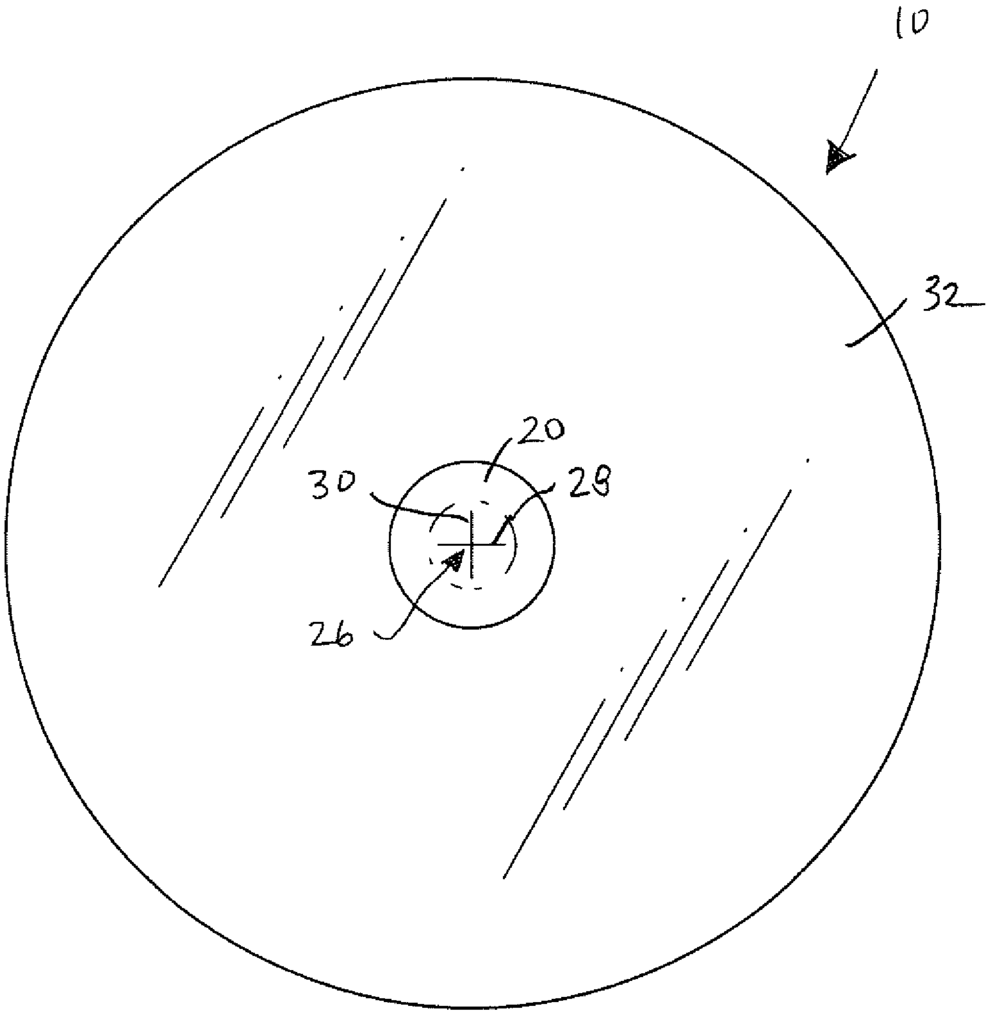
FIG. 6 is a top view of the lid component of FIG. 1.
Figure 7:
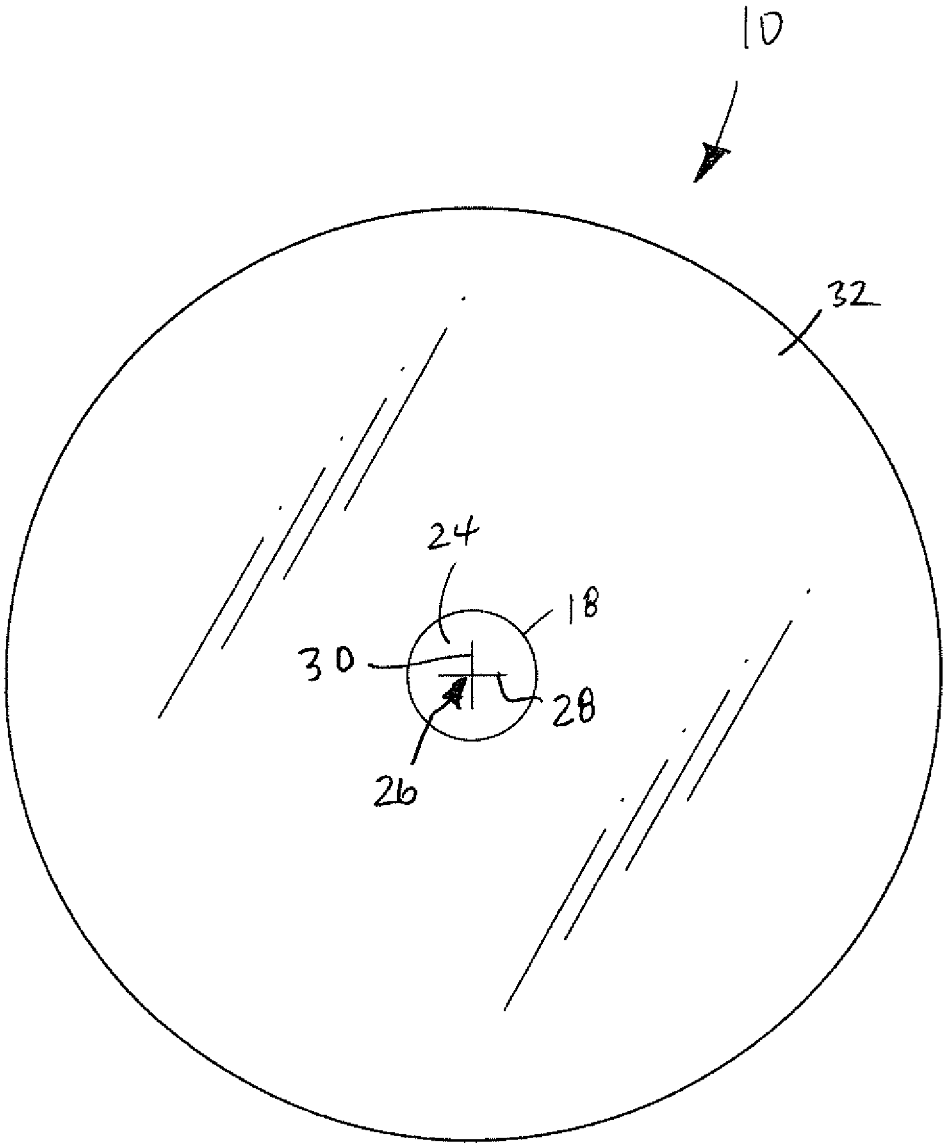
FIG. 7 is a bottom view of the lid component of FIG. 1.

As perhaps best seen in FIG. 5, the top wall 20 of the lid component 10 is tapered from the side wall 22. This structure helps fermentation gas to escape while, at the same time, prevents outside air from entering the glass jar. Such air, which contains oxygen, can cause oxidation of the food contents and thereby spoilage. The shore hardness of the silicone rubber and valve resistance have been designed to be consistent with the pressure released from fermenting vegetables or other foodstuffs so as to allow fermentation gases to escape while preventing oxygen containing air from entering the jar from outside the jar.

Figure 4:
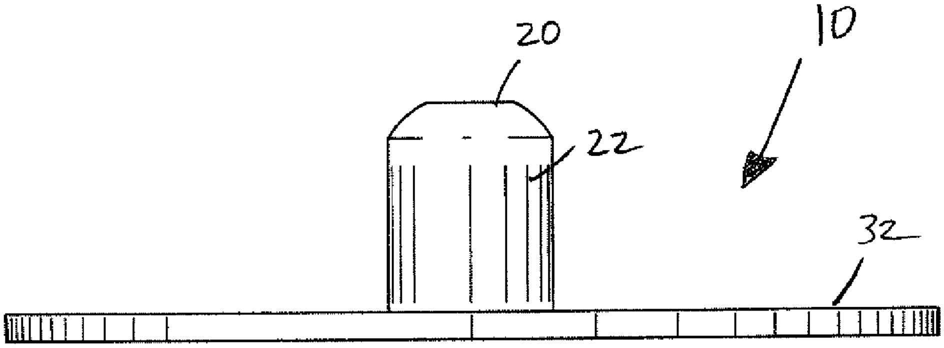
FIG. 4 is a side view of the lid component of FIG. 1 from a first side.

As shown in all figures, the lid component 10 includes a planar sealing wall extending radially outwardly from said bottom opening 18. The sealing wall has a uniform thickness as best seen in FIGS. 4 and 5.

Although not clearly depicted, the sealing wall 32, upstanding side wall 22 and top wall 20 are of uniform thickness. The thickness of the valve top wall 20 and the material from which it is made affects the usefulness of the valve 16 in allowing gases to exit the glass jar 12 while preventing air from entering the jar 12. If the walls are too thin, it would be too easy for outside air to enter the jar. Generally, the wall thicknesses should be at least 1 mm, preferably at least 2 mm, and may be as thick as 3-4 mm. In this embodiment, the wall thicknesses are about 2 mm.

In order to fit a standard mason jar opening, the sealing wall has a diameter of about 8.5 cm.

Changes can be made to the aforementioned embodiment. For example, the dimensions of the lid component can be altered to suit different sizes of mason jars or other articles as may be manufactured from time to time, and can be from 6, 7, 8 or 9 cm in diameter, or up to 15, 14, 13, 12, 11, 10, or 9 cm in diameter, as well as everything in between. The sealing wall 32 need not be perfectly circular but should be of a size and shape to allow for an air tight seal to be formed over the contents of the glass jar 12 using the band 14. Thus, if the shape and size of the glass jar or other container and sealing band changes, the shape and size of the sealing wall 32 can change too.

The lid component 12 can be made of materials other than silicone rubber as well as combinations of materials. For example, the sealing wall 32 could be made of metal and the valve 16 could be made of plastic or silicone rubber. What is required is that the lid component be air impermeable (other than at the valve) and be made of a material and/or construction to provide an air tight seal when clamped down using the band. The valve must be constructed to allow the egress of fermentation gas while preventing the ingress of outside air. This is ideally achieved by having an opening that allows the one-way flow of gas (as is the case in the above-described embodiment) when pressure inside the jar reaches a threshold level. The present invention achieves this by using a flexible and resilient but also sufficiently rigid material to make the valve 16 so that the valve is closed until the pressure inside the jar reaches a threshold pressure. The valve must be sufficiently resilient to allow gas to escape at such threshold pressure.

Preferably, the material used for the lid component is BPA free, made of inexpensive materials, and easy to clean and sanitize for repeated hygienic use.

The valve 16 can be positioned anywhere in the lid component 10 and need not be centered as depicted and described herein. For example, the valve 16 can be positioned off-center (i.e. off to one side) on the lid component 10. Furthermore, different thicknesses can be used for different parts of the lid component 10, i.e. all walls 20, 22, and 32 do not need to be the same thickness. The person of ordinary skill in the art will appreciate that other changes can be made to the embodiment herein described without departing from the scope of the invention claimed below.

The invention claimed is:

1. A lid component for use with a jar and a band, the lid component being made of an air-impermeable material and being dimensioned and configured to be releasably attachable to the jar by the band and to seal a wide mouth opening of the jar in an air-tight manner, the lid component comprising:

a one-way valve adapted to allow gas to escape from the jar while, at the same time, prevent air from entering the jar, when the lid component is releasably attached to the jar; and a sealing wall, wherein the one-way valve comprises a bottom opening and a protruding top wall, the protruding top wall defining a space and the protruding top wall having at least one opening biased towards a closed position and movable to an open position when pressure inside the space exceeds atmospheric pressure by a threshold amount;

wherein the sealing wall extends radially outwardly from the bottom opening;

wherein the lid component has a height and a diameter;

wherein the bottom opening has a bottom opening diameter;

wherein the sealing wall has a sealing wall diameter that is equal to the diameter of the lid component minus the bottom opening diameter; and wherein the sealing wall diameter is at least two (2) times greater than the height of the lid component.

2. The lid component of claim 1, wherein the lid component is of unitary construction for ease of manufacture.

3. The lid component of claim 2, wherein the lid component is made of a flexible and resilient material.

4. The lid component of claim 3, wherein the material is silicone rubber.

5. The lid component of claim 1, wherein the sealing wall has a uniform thickness.

6. The lid component of claim 1, wherein the sealing wall and protruding top wall are of uniform thickness.

7. The lid component of claim 5, wherein the sealing wall has a thickness of about 1 to about 3 mm.

8. The lid component of claim 7, wherein the thickness is about 2 mm.

9. The lid component of claim 1, wherein the sealing wall has a diameter of about 8.5 cm.

10. The lid component of claim 1, wherein the opening consists of perpendicular slits in the top wall.

11. A fermentation kit comprising a lid component according to claim 1, a jar, and a band configured to releasably attach the lid component to the jar.

12. A lid component for use with a jar and a band, the lid component being made of an air-impermeable material and being dimensioned and configured to be releasably attachable to the jar by the band and to seal a wide mouth opening of the jar in an air-tight manner, the lid component comprising:

a one-way valve adapted to allow gas to escape from the jar while, at the same time, prevent air from entering the jar, when the lid component is releasably attached to the jar; and a sealing wall, wherein the one-way valve comprises a bottom opening and a protruding top wall, the protruding top wall defining a space and the protruding top wall having at least one opening biased towards a closed position and movable to an open position when pressure inside the space exceeds atmospheric pressure by a threshold amount;

wherein the sealing wall extends radially outwardly from the bottom opening;

wherein the lid component has a diameter; and wherein the bottom opening has a bottom opening diameter;

wherein the sealing wall has a sealing wall diameter that is equal to the diameter of the lid component minus the bottom opening diameter; and wherein the sealing wall diameter is at least three (3) times greater than the bottom opening diameter.

13. The lid component of claim 12, wherein the lid component is of unitary construction for ease of manufacture.

14. The lid component of claim 13, wherein the lid component is made of a flexible and resilient material.

15. The lid component of claim 14, wherein the material is silicone rubber.

16. The lid component of claim 12, wherein the sealing wall has a uniform thickness.

17. The lid component of claim 12, wherein the sealing wall and protruding top wall are of uniform thickness.

18. The lid component of claim 16, wherein the sealing wall has a thickness of about 1 to about 3 mm.

19. The lid component of claim 18, wherein the thickness is about 2 mm.

20. The lid component of claim 12, wherein the sealing wall has a diameter of about 8.5 cm.

21. The lid component of claim 12, wherein the opening consists of perpendicular slits in the top wall.

22. A fermentation kit comprising a lid component according to claim 12, a jar, and a band configured to releasably attach the lid component to the jar.

* * * * *